Oct. 23, 1928.

W. R. DICK 1,688,690

COOKING UTENSIL

Filed Dec. 4, 1926

2 Sheets-Sheet 1

INVENTOR.
WILLIAM R. DICK
BY A. B. Bowman
ATTORNEY

Oct. 23, 1928.
W. R. DICK
COOKING UTENSIL
Filed Dec. 4, 1926
1,688,690
2 Sheets-Sheet 2
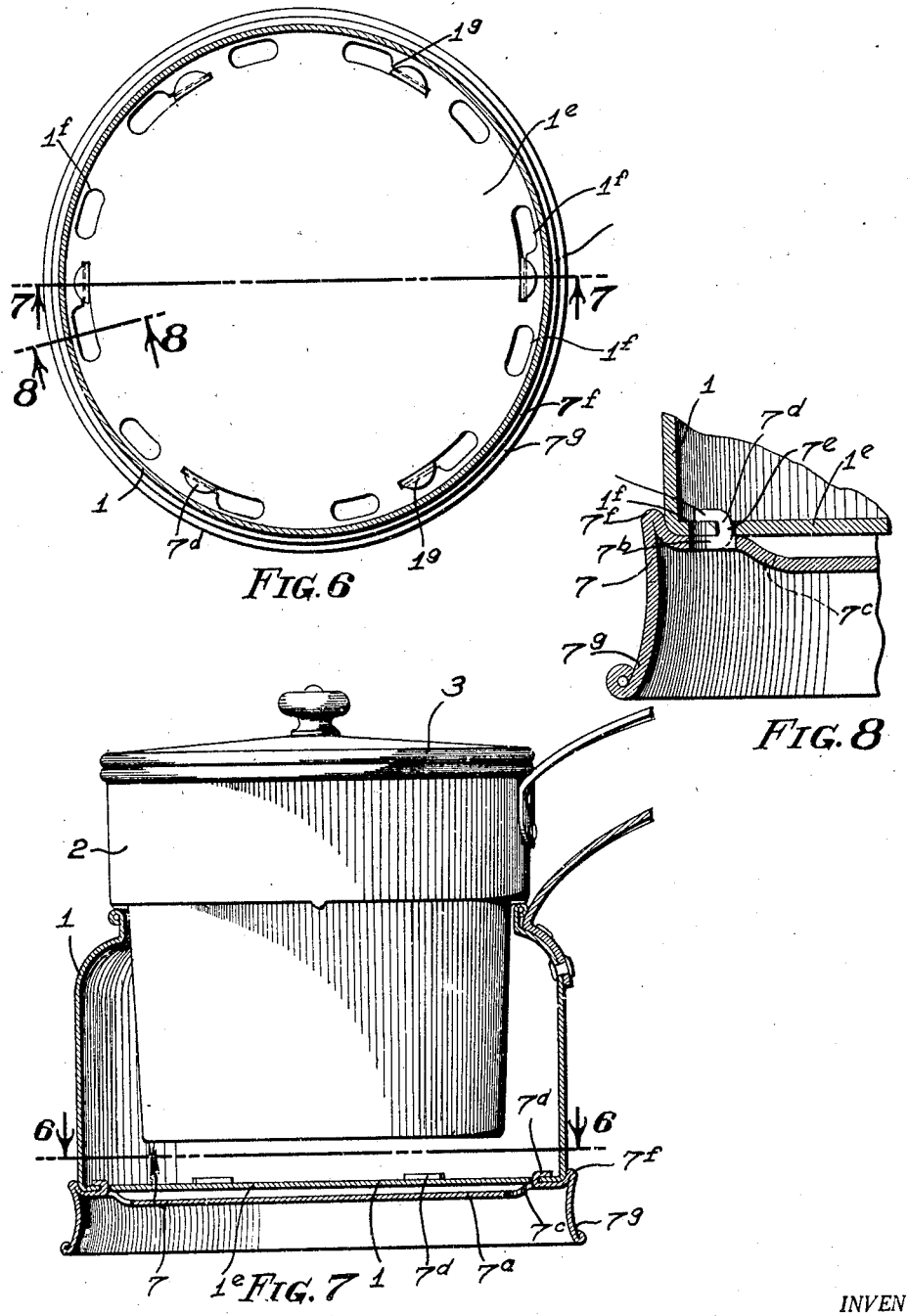
INVENTOR.
WILLIAM R. DICK
BY A.B.Bowman
ATTORNEY Patented Oct. 23, 1928.

1,688,690

UNITED STATES PATENT OFFICE.

WILLIAM R. DICK, OF SAN DIEGO, CALIFORNIA.

COOKING UTENSIL.

Application filed December 4, 1926. Serial No. 152,584.

My invention relates to cooking utensils of the double waterless type, and the objects of my invention are: first, to provide a cooker of this class with a quickly and readily removable bottom or bottoms so that the bottom or cooker parts may be easily accessible for cleaning and drying, and the upper of one of the lower receptacles is protected from direct contact with the flame or heat source, and that the lower bottom member may be readily replaced with a new one; second, to provide a cooker of this class in which there are provided two heat reservoirs; third, to provide a cooker of this class in which the heat from the lower reservoir may pass directly upwardly between the outer surface of the upper receptacle, and the inner surface of one of the lower receptacles, or may pass directly through perforations near the inner side of the inner wall of the lower receptacles; fourth, to provide a cooker of this class in which the lower receptacle is provided with a lower convex surface with perforations at its outer edge therefore spreading the flame or blaze and causing heat to pass directly through perforations at the outer edge between the cooking receptacle and the lower receptacle, so that it does not contact directly with the cooking receptacle at the bottom; and fifth, to provide a cooker of this class which is very simple and economical of construction, efficient in its action, durable, and which will not readily deteriorate or get out of order.

Figure 2:
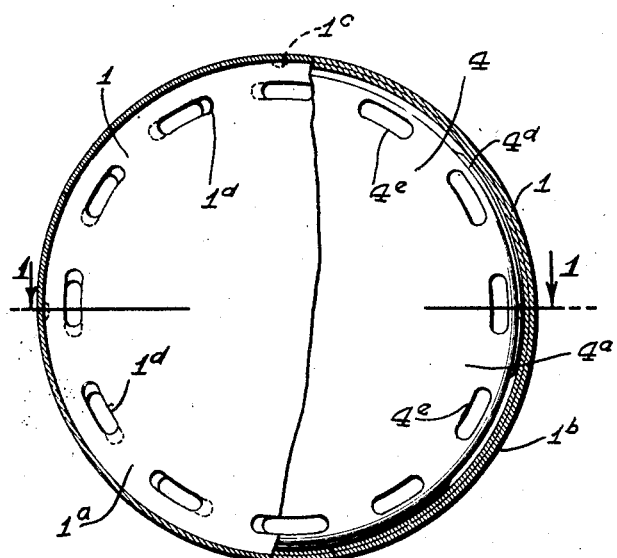
Figure 5:
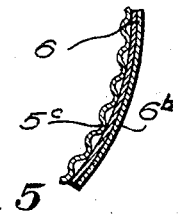
Figure 4:
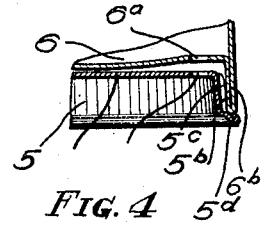
Figure 1:
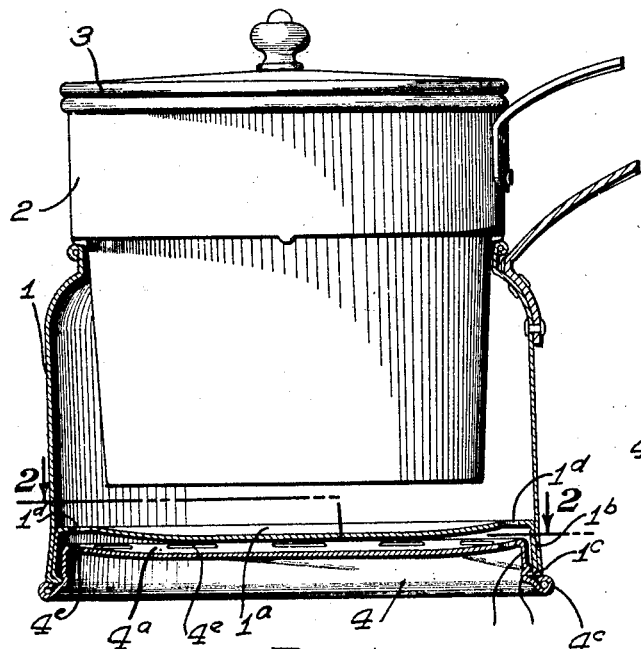
Figure 3:
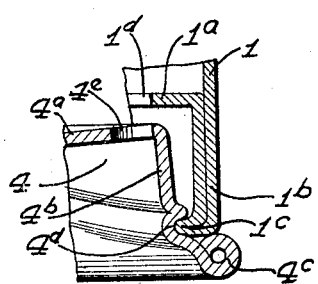

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my cooker, showing the lower receptacles in section, taken through 1—1 of Fig. 2; Fig. 2 is a transverse sectional view thereof, taken through 2—2 of Fig. 1, showing a portion of the bottom of the lower receptacle broken away in order to disclose a portion of the removable bottom; Fig. 3 is an enlarged, detailed, transverse, sectional view of a portion of the lower receptacle and removable bottom of my preferred construction; Fig. 4 is a similar view showing a modified form of removable bottom; Fig. 5 is an enlarged, detailed, fragmentary view in transverse section through 5—5 of Fig. 4, showing this modified construction; Fig. 6 is a transverse sectional view through the line 6—6 in Fig. 7 of a further modification of my cooking utensil; Fig. 7 is an elevational view of said modified cooker in which the lower receptacles are shown in section, and Fig. 8 is a fragmentary sectional view through 8—8 of Fig. 6.

Like characters of reference refer to similar parts and portions throughout the several views of the drawings.

The principal parts of the preferred form of cooker, illustrated in Figs. 1, 2 and 3, comprise a lower supporting receptacle 1, a cooking or roasting receptacle 2 supported therein, and a cover 3, all of which parts have substantially the same contours as those of the conventional double boiler.

The bottom $1^a$ of the receptacle 1 is so positioned as to provide space underneath the receptacle, the walls thereof forming a flange $1^b$ extending somewhat beyond the bottom $1^a$. The flange $1^b$ may be formed in the manner illustrated in detail in Fig. 3, the flange actually comprising two thicknesses of the metal of which the receptacle 1 is formed. At several points on the inner surface of the flange, small knobs $1^c$ are formed, preferably by suitably punching the flange metal inwardly at the desired points. The bottom $1^a$ is bellied slightly downwardly and is further provided with a number of oblong perforations $1^d$ near its outer periphery, it being otherwise solid and preferably an integral part of the receptacle 1. An inverted, pan-shaped fire bottom member 4 is adapted to be screwed into the flange $1^b$. The fire bottom member 4 comprises a slightly bellied, circular portion $4^a$ having a downwardly extending flanged portion $4^b$ in its upper portion, substantially cylindrical in shape and slightly smaller in diameter than the inner surface diameter of the flange 1$^b$. The lower part of the flange 4$^b$ flares outwardly slightly, terminating in a beaded rim 4$^c$. The outer surface of the flange 4$^b$ is provided with grooves 4$^d$ at intervals, forming a part of a screw thread, into which the knobs 1$^c$ are capable of being screwed, there being an equal number of knobs and grooves suitably spaced. The fire bottom 4$^a$ is provided with perforations 4$^e$, corresponding in number and spaced with the perforations 1$^d$ in the bottom member 1$^a$. On screwing the fire bottom member 4 into the flange 1$^b$, the knobs 1$^c$ enter easily into the grooves 4$^d$. Owing, however, to the flange 4$^b$ tapering outwardly slightly, the knobs begin to bear against the bottom of the grooves as the fire bottom 4 is screwed in, permitting the knobs 1$^c$ to firmly grip and hold the fire bottom 4 in position. When screwed home, the rim 4$^e$ bears against the bottom edge of the flange 1$^b$. The fire bottom member 4 is only in metallic contact with the knobs 1$^c$ and lower end of the flange 1$^b$, it being separated from the flange 1$^b$ and bottom 1$^a$ at all other upper points by a short air gap.

In operation the fire bottom 4 serves to support the cooker, comprising the receptacles 1 and 2, on a heating device, and also protects the bottom 1$^a$ from direct contact with any flame or heat. I prefer to form the fire bottom member 4, for this reason, out of suitable gage heat resisting sheet metal, such as steel, or it may be made in the form of a casting of iron or other durable material. The limited points of contact between the fire bottom member and lower receptacle prevent any great amount of localized heat from being conducted from the fire bottom to the receptacle, thus preventing damage to the latter due to excessive local heating.

In the modified form illustrated in Figs. 4 and 5, the receptacle 6, a fractional view only of which is shown, is provided with a downwardly extending annular flange member 6$^b$ and bottom 6$^a$ similar to the corresponding parts of the preferred construction just described. The fire bottom member 5 is provided with a slightly outwardly tapering, annular flange member 5$^b$, the upper portion thereof having axially and outwardly extending corrugations 5$^c$, the lower edge being formed into a beaded rim 5$^d$. The outside diameter of the fire bottom member, taken over the corrugations 5$^c$, is practically equal to that of the inner flange face, so that the fire bottom 5 is a tight push fit into the flange, the slight taper of the flange 5$^b$ giving the action necessary to insure a satisfactory fit. The extreme inward movement of the fire bottom 5 is limited by the outwardly projecting rim 5$^d$ striking the lower edge of the flange 6$^b$. In this position a short air gap remains between the bottom 6$^a$ of the receptacle 6 and the bottom 5$^a$ of the fire bottom member 5. The actual metallic contact existing between the fire bottom member and the receptacle 6 is that formed by the outer periphery of the corrugations 5$^c$ and the inner flange surface.

In the modified form of construction shown in Figs. 6, 7 and 8 of the drawings, the members 2 and 3 are the same as those shown in Figs. 1 and 2. The bottom portion of the member 1, however, is a straight bottom 1$^e$ in the usual form and provided with a plurality of elongated openings 1$^f$ adjacent the side walls and provided with extended narrow slots 1$^g$ communicating therewith and extending concentrically with the center of the bottom and the member 7 is provided with a concavo-convex main portion 7$^a$ provided with a plurality of holes 7$^b$ which conform to the holes 1$^f$ when the bottom is in position, as shown best in Figs. 6 and 7 of the drawings, thus providing an open space thru the members 1$^e$ and 7$^a$ so that heat may be directed between the lower side of the vessel 2 and the inside of the receptacle 1. This member 7 is also provided with cut-away portions 7$^c$, which are extended upwardly and backwardly, forming lugs 7$^d$, and with vertical portions 7$^e$ so that the bottom 7 may be secured to the vessel 1 in the bottom 1$^e$ by placing the member 7$^d$ in the openings 1$^f$, then turning the member 7 relative to the member 1, so that the portion 7$^e$ enters the slots 1$^g$ and the portion 7$^d$ locks the members 1$^e$ and 7 together. The member 7 is extended upwardly at 7$^f$ to protect the outer edge of the vessel 1, then downwardly, forming a flange 7$^g$, thus providing a readily removable bottom for the vessel 1. It will be here noted that this bottom 7 is preferably made of high heat withstanding material adapted to protect the bottom of the vessel 1.

It will be noted that in both modifications described, I have provided a detachable fire bottom, which, when in place, provides a space in which the direct heat from a flame or other source may be accumulated and distributed to an outer air chamber where it can equalize, thereby eliminating excessive localization or concentration of heat, which would result in damage to metal of the lower receptacle. From the outer air chamber, the heat passes to the inner air chamber and thence to the upper receptacle. In so doing the heat will have become equalized and all serious localization will be eliminated before contact is made with the lower receptacle, while a complete equalization will have been accomplished before contact is made with the upper receptacle.

Though I have shown and described a particular construction, combination and arrangement of parts and portions and certain modifications thereof, I do not wish to be limited to this particular construction, combination and arrangement nor to the modifications, but desire to include in the scope of my invention, the construction, combination and arrangement substantially as set forth in the appended claims.

Having thus described my invention, what I claim as new and desire to secure by Letters Patent is:

1. In a waterless double cooker, an upper inner receptacle, a lower outer receptacle adapted to receive the lower portion of and support said upper inner receptacle and provided with a flanged, downwardly extending bottom portion, and a readily removable bottom adapted to fit into the flanged portion of said lower outer receptacle and its horizontal portions spaced slightly therefrom.

2. In a waterless double cooker, an upper inner receptacle, a lower outer receptacle adapted to receive the lower portion of and support said upper inner receptacle and provided with a downwardly extending, flanged bottom portion, and a readily removable bottom, the horizontal portion of which is composed of heat withstanding material adapted to fit into the flanged portion of said lower outer receptacle and spaced slightly therefrom.

3. In a waterless double cooker, an upper inner receptacle, a lower outer receptacle adapted to receive the lower portion of and support said upper inner receptacle and provided with a flanged, downwardly extending bottom portion, a readily removable bottom adapted to fit into the flanged portion of said lower outer receptacle and its horizontal portion spaced slightly therefrom, and means for readily securing said readily removable bottom portion in said flanged portion.

4. In a waterless double cooker, an upper inner receptacle, a lower outer receptacle adapted to receive the lower portion of and support said upper inner receptacle and provided with a downwardly extending, flanged bottom portion, a readily removable bottom, the horizontal portion of which is composed of heat withstanding material adapted to fit into the flanged portion of said lower outer receptacle and spaced therefrom, and means for readily securing said readily removable bottom portion in said flanged portion.

5. In a waterless double cooker, an upper inner receptacle, a lower outer receptacle spread near its upper edge and considerably larger than said upper inner receptacle and provided with a concavo-convex horizontal portion with openings adjacent its periphery and provided with downwardly extending, flanged portions, and a readily removable bottom portion conforming substantially in shape with the lower portion of said lower outer receptacle and adapted to fit into the flanged portion thereof, provided with a row of holes therein conforming to the row of holes in said lower outer receptacle.

6. In a waterless double cooker, an upper inner receptacle, a lower outer receptacle spread near its upper edge and considerably larger than said upper inner receptacle and provided with a concavo-convex horizontal portion with openings adjacent its periphery and provided with downwardly extending, flanged portions, a readily removable bottom portion conforming in shape to the lower portion of said lower outer receptacle and adapted to fit into the flanged portion thereof, provided with a row of holes therein conforming to the row of holes in said lower outer receptacle, and means for rigidly securing said readily removable bottom member in position in said flanged portion.

7. In a waterless double cooker, the combination with the lower outer receptacle with perforated bottom, of a substantially conforming, readily removable, perforate bottom portion adapted to fit therein.

8. In a waterless double cooker, the combination with the lower outer receptacle with perforated bottom, of a readily removable perforate bottom of different heat resisting material positioned therein, and frictional contact means for rigidly connecting said members together.

9. In a cooking utensil of the class described, a supporting member with a bottom with a double, downwardly extending flange, and a detachable bottom with downwardly extended, flanged portions adapted to fit snugly in said double, downwardly extending flange.

10. In a cooking utensil of the class described, a supporting member with a bottom with a double, downwardly extending flange, and a detachable bottom with downwardly extended, flanged portions adapted to fit snugly in said double, downwardly extending flange and with its lower edge extending outwardly past the inner surface of said double flange.

11. In a cooking utensil of the class described, the combination with a cooking receptacle of a lower receptacle supporting said cooking receptacle, and provided with a concavo-convex bottom with a horizontal outer edge provided with perforations, said horizontal outer edge being adapted to conduct heat directly upwardly between the two receptacle walls.

12. In a cooking utensil of the class described, the combination with a cooking receptacle of a lower receptacle supporting said cooking receptacle, and provided with a concavo-convex bottom with a horizontal outer edge provided with perforations, said horizontal outer edge being adapted to conduct heat directly upwardly between the two receptacle walls, and a quickly removable bottom provided with a central concavo-convex portion provided with perforations conforming with the perforations in the other receptacle.

13. In a cooking utensil of the class described, a readily removable bottom made of high heat withstanding material provided with perforations near its outer side, and concavo-convex shaped inwardly from said perforations.

In testimony whereof, I have hereunto set my hand at San Diego, California, this 27th day of November, 1926.

WILLIAM R. DICK.